ABSTRACT OF THE DISCLOSURE

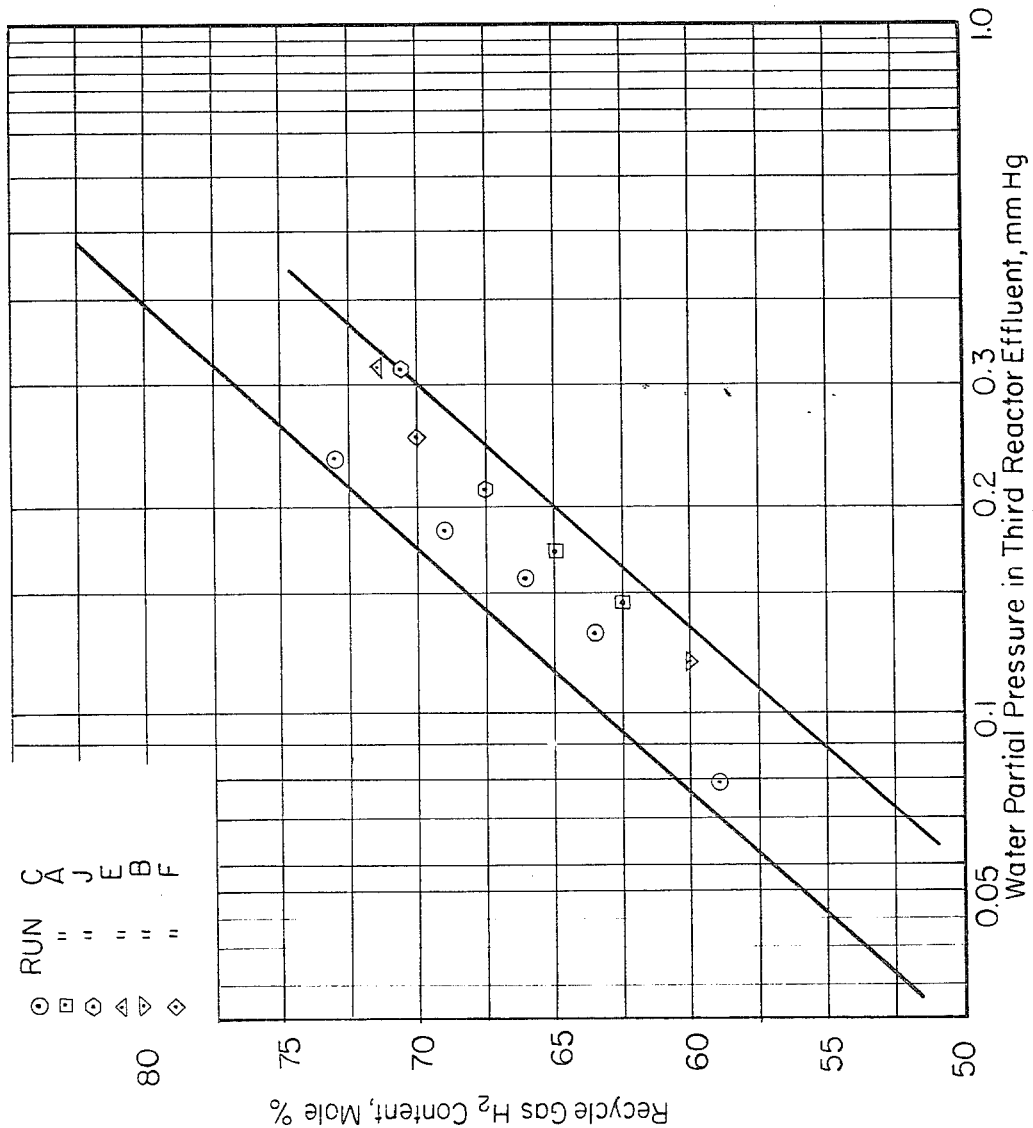
Figure I

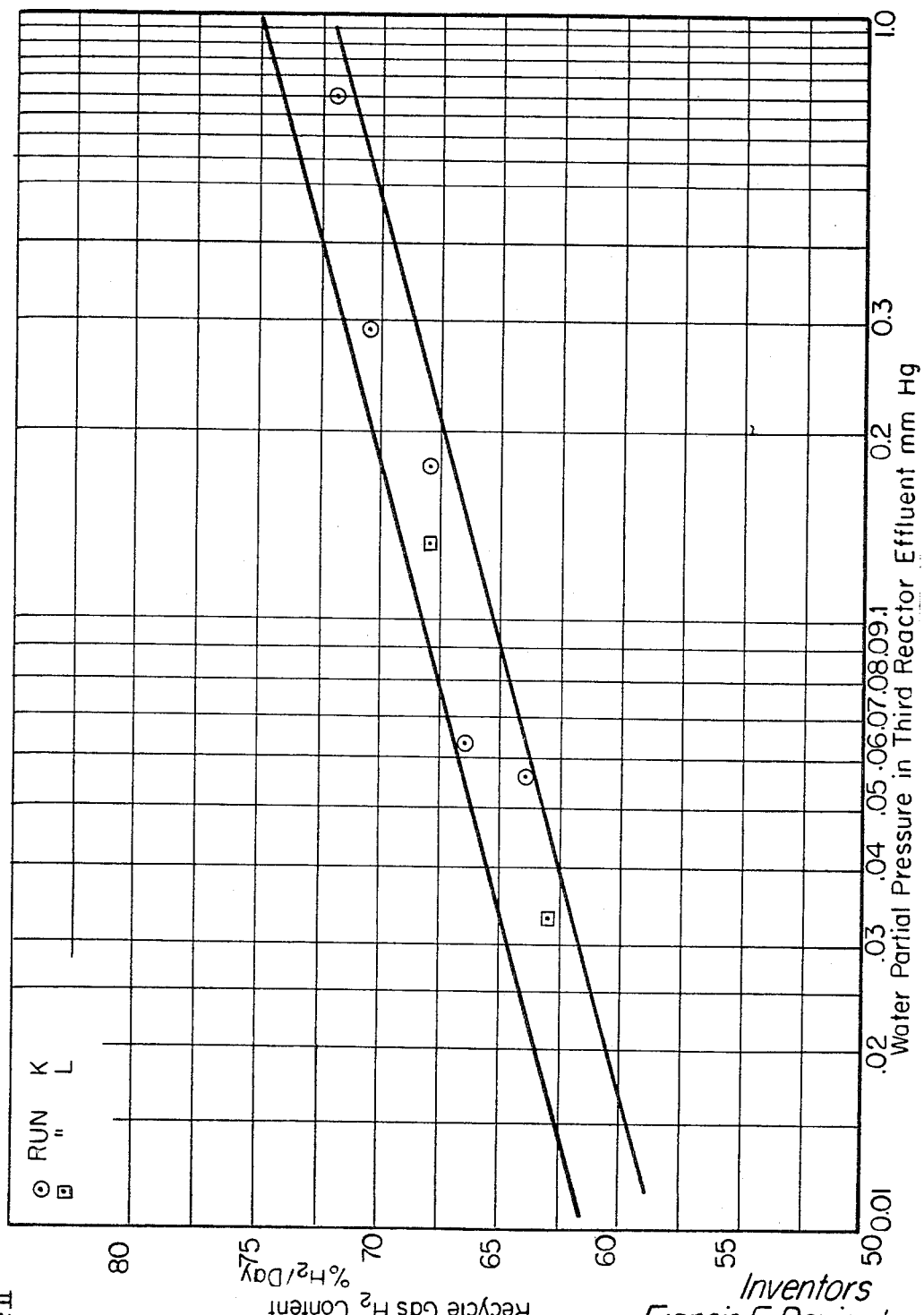
Figure II

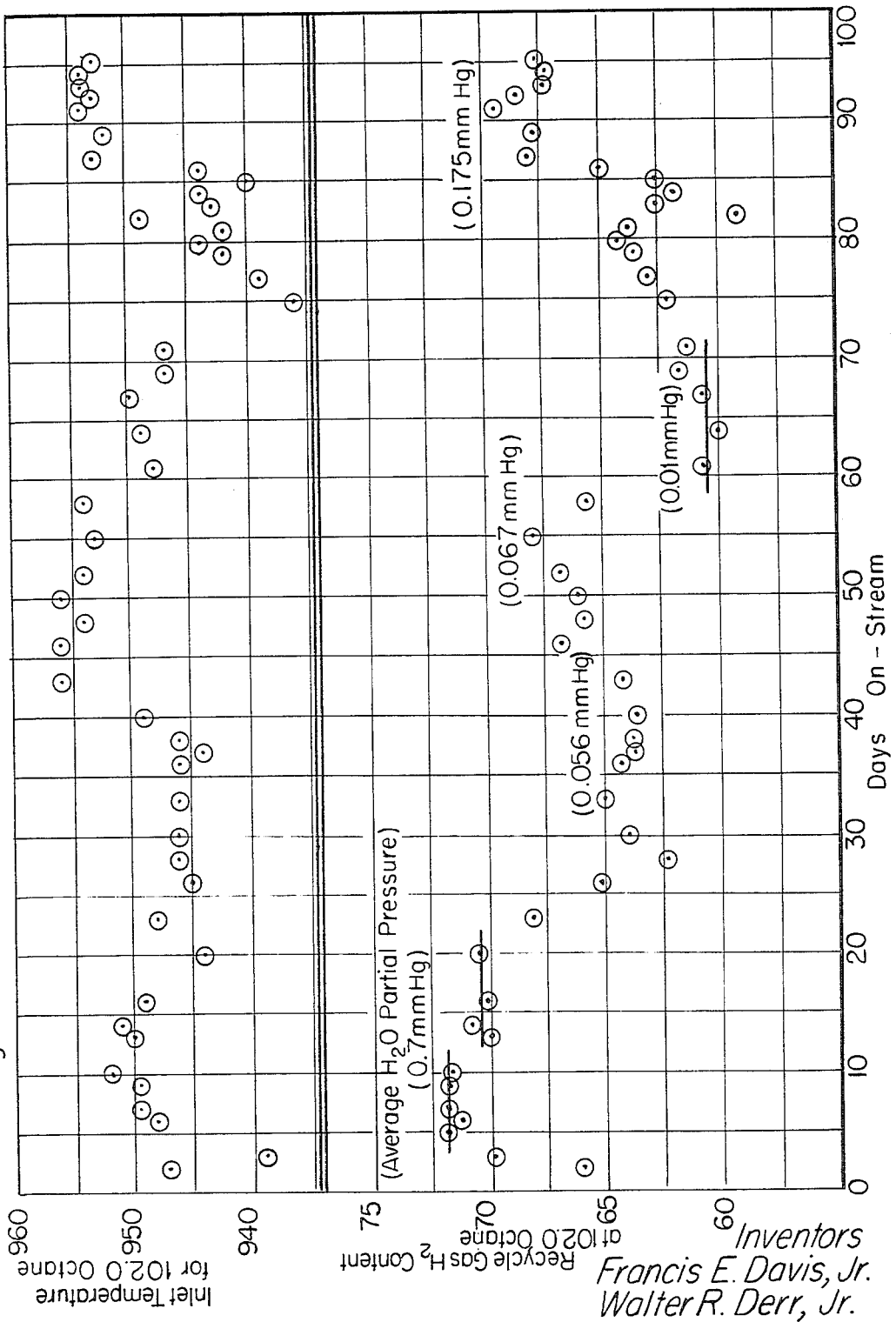
Figure III

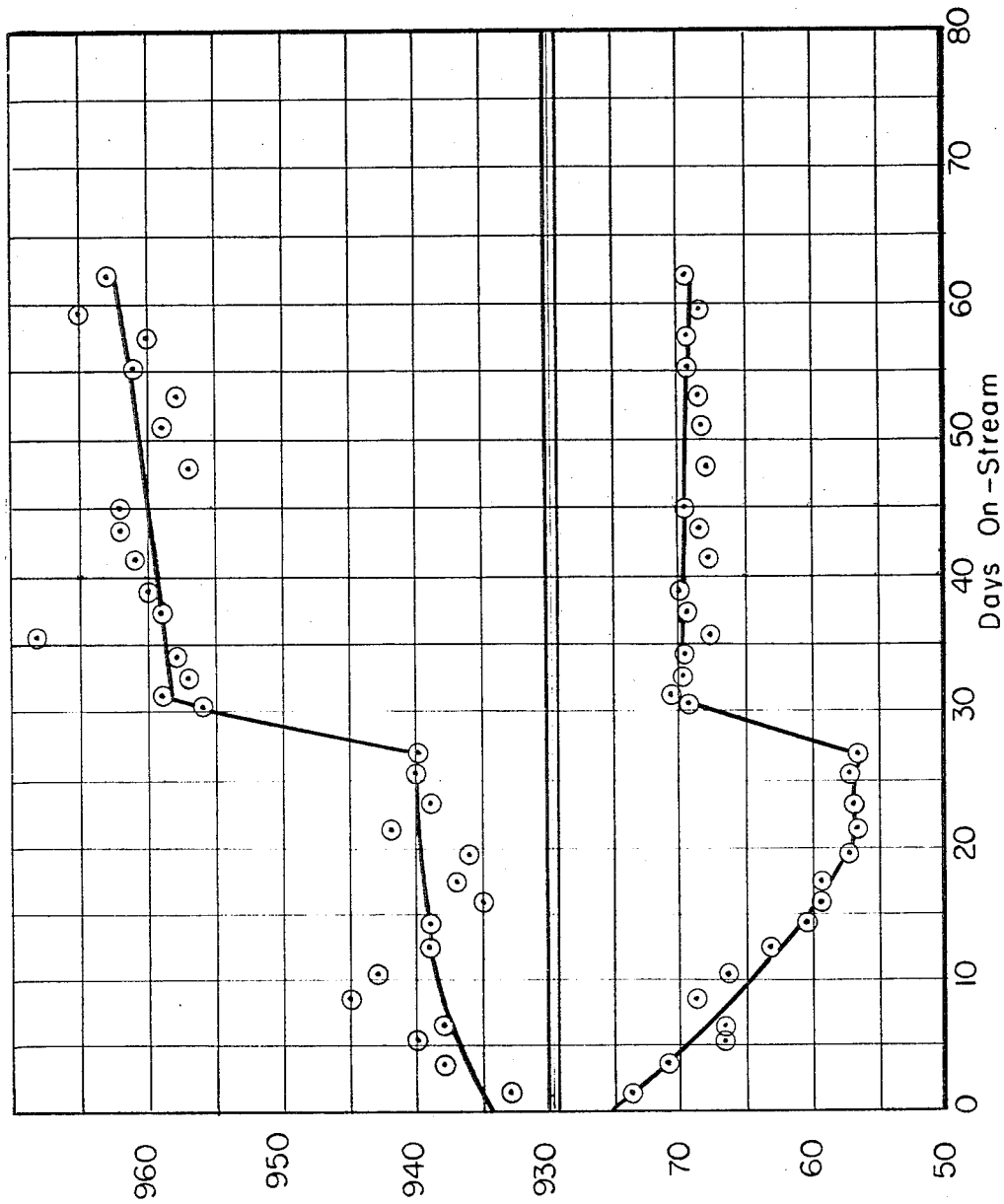
Figure IV

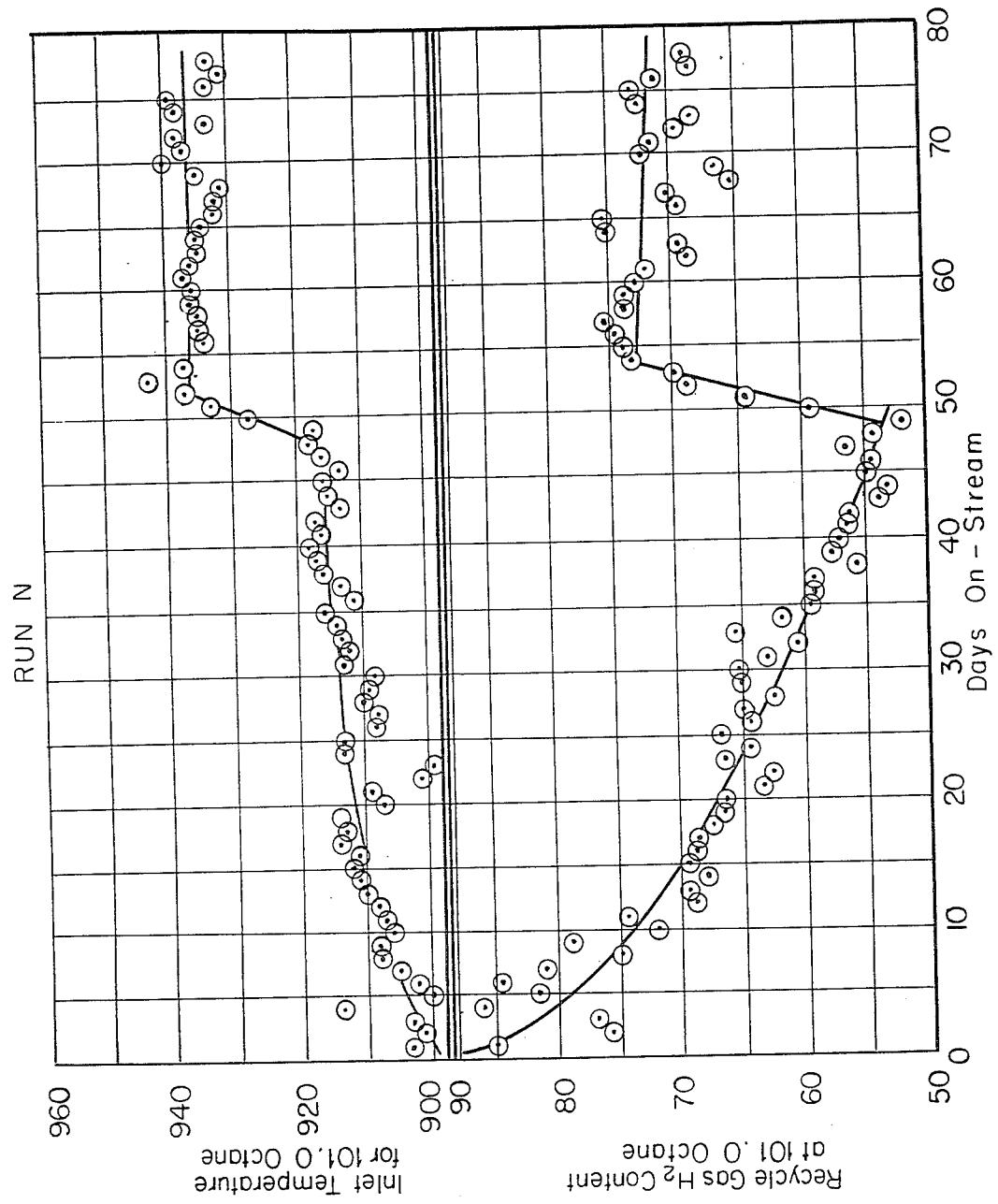
Figure V

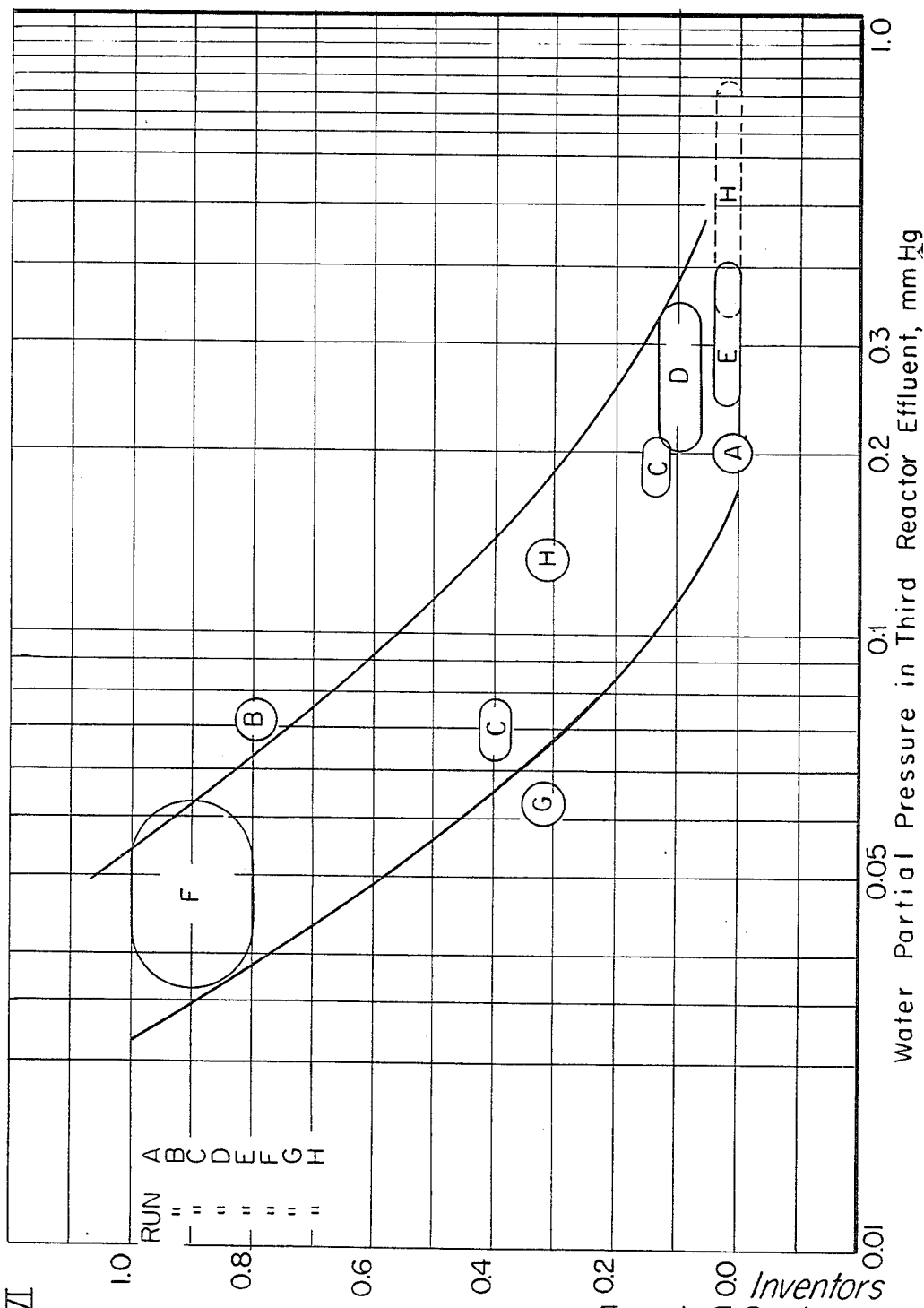
Figure VI

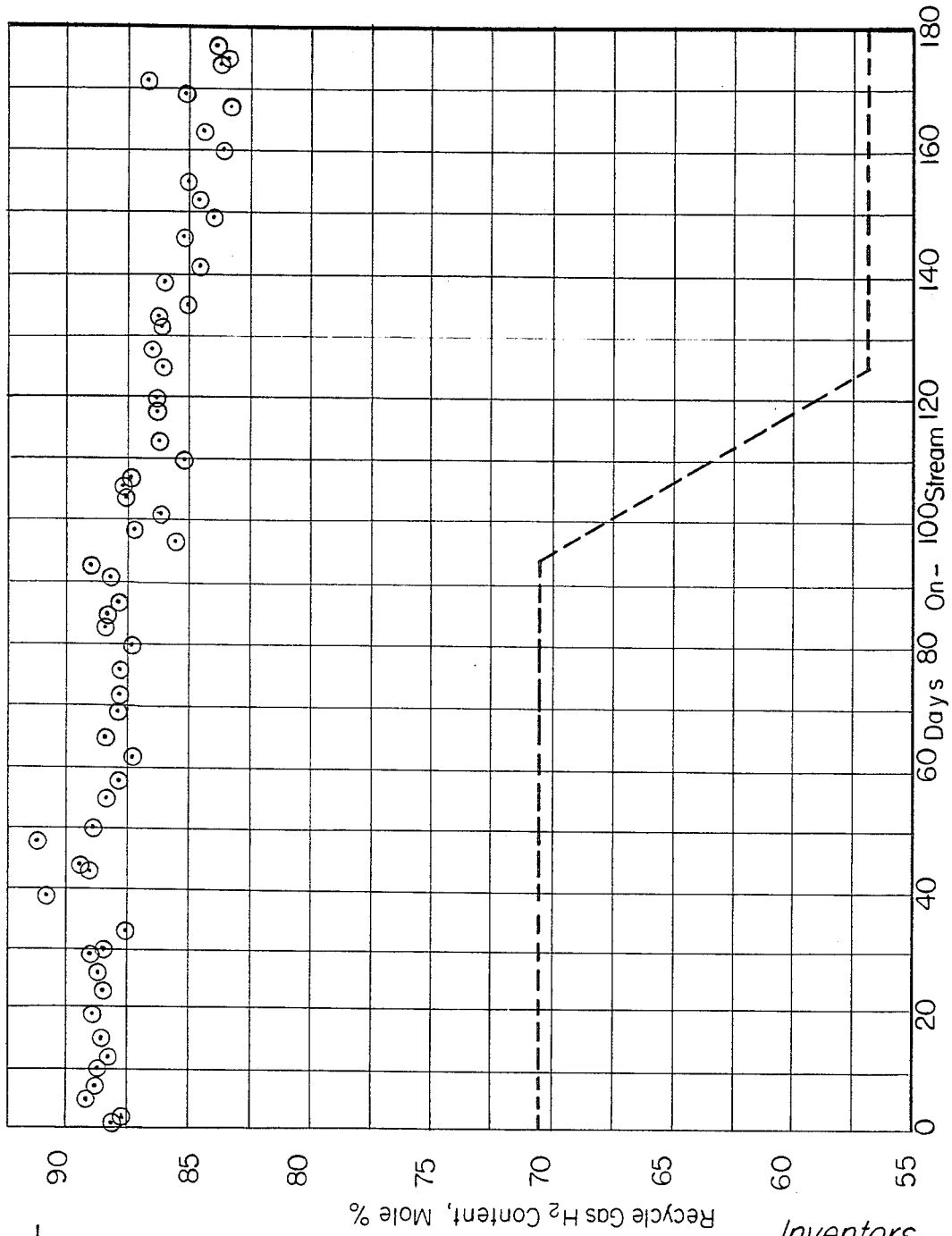
Figure VII 3,474,026
LOW PRESSURE REFORMING OF PARAFFINIC FEED WITH LESS THAN 0.6 WEIGHT PERCENT PT TO MAINTAIN HYDROGEN PURITY OF RECYCLE GAS BY MOISTURE CONTROL
Walter R. Derr, Jr., Ashland, and Francis E. Davis, Jr., Westville, N.J., assignors to Mobil Oil Corporation, a corporation of New York
Filed May 17, 1967, Ser. No. 639,132
Int. Cl. C10g 35/08, 39/00
U.S. Cl. 208—138
4 Claims

A reforming process is described wherein a platinum reforming catalyst comprising from about 0.3 up to about 0.45 weight percent of platinum may be made to be substantially the operational equivalent of a 0.6 weight percent platinum reforming catalyst under low pressure reforming operations below about 400 p.s.i.g. at least with respect to maintaining the hydrogen purity of the recycle gas, product selectivity and octane rating of a reformed naphtha by limiting the water partial pressure in the reformate effluent in a relatively narrow range of from about 0.0019 to 0.005 p.s.i.

Background of the invention

Reforming with platinum-alumina catalyst now constitutes one of the major petroleum processing routes for upgrading naphthas to higher octane gasoline product. With the need to process relatively large volumes of naphthas while maintaining hydrogen purity of the reformate recycle gas in combination with slight gains in reformate product yields permits substantial savings in cost. For example, a reformate yield increase of as little as about 0.5% by volume represents an annual savings of several millions of dollars to the refining industry. Furthermore, any reduction in the amount of platinum required in a reforming catalyst is necessarily accompanied by substantial costs savings also amounting to several millions of dollars accompanied by reducing significantly the drain on our platinum reserves.

The present invention is concerned in one aspect with optimization of a low pressure reforming operation so that it may remain for example, in the category of a non-regenerative reforming operation without suffering undesired losses referred to above with respect to platinum utilization, hydrogen purity of recycle gases and reformate product selectivity of desired octane rating.

There have been several disclosures in the prior art directed to the effect of moisture on a reforming operation employing platinum metal catalysts. For example, in U.S. Patent 2,772,217 the patentees teach that reforming catalysts comprising oxides or sulfides of metals of Groups IV, V, VI, VII and VIII after regeneration thereof contain from about 0.2 to about 1.0% water by weight. In this instant the patentees recommend that the regenerated catalyst be dried to a moisture content in the range of from about 0.1 to 0.8% by weight in a stripping zone. However, it is also known that the moisture content of the catalyst entering a reforming reactor is not the sole source of moisture in the reactor.

In U.S. Patent No. 2,842,482 a reforming method is described in which the recycle gas contains about 0.5% by volume of water. This amount of water alone, however, will contribute to a partial pressure of water vapor of about 10 mm. of mercury at a total reactor pressure of about 54 p.s.i.g. and about 44 mm. of Hg at a total reactor pressure of about 200 p.s.i.g. On the other hand a relatively dry or desiccated reforming operation has been described in the prior art as one in which the moisture content of the effluent recovered from the last reaction zone expressed as partial pressure of water at 200 p.s.i.g. total pressure is found to be less than 0.4 mm. of Hg and preferably from about 0.05 to about 0.2 mm. of Hg.

In the prior art of U.S. Patent 3,234,120 there is also described a reforming operation at pressures below about 400 p.s.i.g. wherein it is desired to maintain the catalyst surface area above about 200 square meters per gram by a control of the water or moisture level encountered by the catalyst during reforming, regeneration and start up of the operation after regeneration of the catalyst. In this prior art patent it is explained that there are at least three sources of water available for contact with the catalyst in the reforming reaction zones. One source of water is found in the charge naphtha which may contain up to as high as about 10–15 parts per million of water. A concentration of 15 p.p.m. of water in the charge naphtha is said to contribute about 0.08 mm. of Hg to the total partial pressure of water in the reaction zone when at a total reaction zone pressure of about 200 p.s.i.g. An undried recycle gas, however, will easily build this water pressure up to 0.5–2.0 mm. Hg partial pressure. In addition, it is to be noted that this patent indicates that this amount of water in the reaction zone vapors does no adversely effect the activity of platinum group metal reforming catalyst but it does produce a lower yield of $C_5+$ reformate by volume from a $C_5$ to 250° F. end point feed than when the partial pressure of the final effluent of the reforming zone is maintained within the range of from about 0.05 to about 0.2 mm. Hg. It will be observed further however upon close examination that the information provided by this patent is derived from the use of a catalyst comprising 0.6 weight percent of platinum on a suitable alumina support in which there is combined up to about 0.7% by weight of chlorine.

In the prior art of U.S. Patent 3,110,703 which relates to reforming in the presence of a platinum alumina catalyst, there is explained that the chlorine content of the catalyst in at least the initial catalytic reaction zone tends to accumulate and increase to an undesirable amount tending to promote hydrocracking. This unsatisfactory result may be overcome however by limiting the surface area of the catalyst employed to levels of from about 1 to about 300 square meters per gram and preferably from about 9 to about 130 square meters per gram. At these levels it is alleged that the halogen pick up or increased hydrocracking activity of the platinum alumina catalyst is substantially lessened by avoiding excessive chlorine levels and thus excessive hydrocracking of naphthene in the first reforming zone.

In the prior art of U.S. Patent 2,952,611 there is defined a regenerative platinum catalyst reforming process wherein the desirability of maintaining moisture levels below about 100 p.p.m. is discussed by the combination of feed driers, recycle gas driers, regeneration gas driers and other means for obtaining and retaining the desired moisture level. It is to be particularly noted however that this patent particularly identifies that at moisture levels below 100 p.p.m. (parts per million) that a very rapid and surprising increase of reformate yields is attained when processing naphthenic Gulf Coast naphthas in the presence of platinum catalyst having a platinum content in the range of from about 0.3 to about 0.6 weight percent when in combination with a halogen at a level in the range of from about 0.5 to about 1.5 weight percent. This patent also emphasizes that the super dry operation substantially eliminates a condition of halogen stripping during the on-stream oil cycle and thus assures substantially constant halogen level.

Summary of the invention

In accordance with the present invention it has now been found however and quite unexpectedly that substantially beneficial advantages can also be realized in a low pressure reforming operation preferably below about 400 p.s.i.g. and preferably in the range of from about 100 to about 350 p.s.i.g. provided that the combined moisture level of the reactants contributing to the partial pressure of water vapor in the influent and found in the reformate effluent is controlled within a relatively narrow range of from about 0.1 to about 0.2 mm. of Hg. It has also been discovered among other things that the $H_2$ purity of the reformate recycle gas is a function of the moisture content of water partial pressure as determined in the total effluent as recovered from the last reactor so that below a water partial pressure of about 0.1 mm. Hg there is a significant drop-off in the catalyst effectiveness for maintaining hydrogen purity of the reformate recycle gas above a desired low limit as well as reformate product selectivity. Furthermore, it has been found in a preferred operation when the moisture level is above a water partial pressure of about 0.004 p.s.i. that one will also encounter undesired reductions in product yields and catalyst activity and stability.

A relationship has been derived between the water content of the feed in cc./bbl. and the water partial pressure of the final reactor effluent in mm. of Hg for a reforming operation employing substantially perfect gas driers. This relationship is as follows:

$$ppH_2O = \frac{(\pi)(cc./bbl.)(3.5)(10^{-5})(MW_n)}{[R+\alpha]\rho_n}$$

On the other hand, when the recycle gas separator down-stream of the last reforming reactor is operated under sufficiently elevated temperature conditions to carry entrained water overhead in the recycle gas-stream recovered therefrom, the relationship between the water content of the feed and the separator overhead becomes:

$$ppH_2O = \frac{(\pi)(cc./bbl.)(3.5)(10^{-5})(MW_n)}{\left[\left(\frac{\alpha-G}{K}\right)+R+G\right]\rho_n}$$

The above relationships hold when:

$ppH_2O$ = partial pressure of water as expressed in mm. of Hg
$\pi$ = total pressure, mm. of Hg
cc./bbl. = water content of naphtha, cc./bbl.
$MW_n$ = naphtha molecular weight
$\rho_n$ = naphtha specific gravity, g/cc.
$\alpha$ = molar increase of naphtha through reactors, moles produce/mole naphtha (usually 2 to 2.5)
$G$ = moles of excess recycle gas per mole of naphtha (usually 1 to 1.5)
$R$ = total recycle ratio, moles recycle/mole naphtha
$K$ = vapor liquid equilibrium constant for water in the separator A startling finding of the present invention resides in the observation that a reforming catalyst of a relatively low platinum content and generally not more than about one half of the platinum content of the reforming catalyst most usually employed may be made to perform operationally in a manner which is at least equivalent to that obtainable with the higher platinum content reforming catalyst normally employed. More specifically, it has now been discovered that the hydrogen purity of the recycle gas recovered from the reformate product may be maintained with a 0.35 wt. percent platinum catalyst to be substantially equivalent to that obtainable with a 0.6 weight percent platinum catalyst. This processing breakthrough has been found possible provided that the moisture or water partial pressure of the reactants introduced to the reforming operation is held within relatively narrow limits as herein defined. In order to achieve the surprising and unpredictable benefits described herein one needs to take particular notice of the unique and contributing sources of water to be coped with in the reforming operation. Accordingly, the sources of water may be coped with by one or more of a combination of feed driers, recycle gas driers and in some cases, regeneration gas driers during the relatively infrequent regeneration of the catalyst. However, in order to obtain the benefits of the present invention we are particularly interested in drying the recycle gas rich in hydrogen down to its lowest value below about 5 p.p.m. and preferably below about 2 p.p.m. before combining the dried recycle gas with the naphtha charge stock to be reformed. Thereafter, it is preferred to add water in amounts sufficient for controlling the moisture level of the reforming operation within the relatively narrow limits herein defined.

Generally, a naphtha reforming charge boils in the range of from about $C_5$ hydrocarbons up to about 280 or 290° F. end point or the naphtha charge may have an end point as high as about 400° F. In one particular aspect the control of the moisture to a level sufficient for this invention is facilitated by also drying the naphtha reactants to a very low level so that the moisture level of the combined recycle gas-naphtha charge can then be adjusted by a controlled addition of water for relatively uniform dispersion in the charge to the reforming operation. For the purpose of clarification it should be noted that water has been found to be soluble in the naphtha charge up to about 100 p.p.m. This level of water solubility however is considerably higher than that required to receive the benefits of the present invention and this serves to emphasize the critical limits to which the present invention is directed.

During an on-stream reforming operation comprising charging a naphtha feed combined with hydrogen rich recycle gas formed in the operation, it is preferred that the hydrogen rich recycle gas separated from the reformate effluent be first dried to a level below about 5 p.p.m. of water and preferably to a level not more than about 2 p.p.m. of water before combining the hydrogen rich recycle gas stream with the naphtha charge. While it is not essential that both the recycle gas and naphtha be dried to such low levels as indicated above it is convenient as a matter of choice to operate in this manner so as to maintain the close control on the moisture level as required by this invention. On the other hand, drying the recycle gas, performs the dual function of removing other undesired constituents such as chlorine and hydrogen sulfide from the gas. One can also maintain much more conveniently as suggested above a close control on the desired moisture level required by the continuous controlled addition of water to the total charge passed to the first reforming zone of the plurality of reforming zones.

In the reforming of hydrocarbons with platinum group metal reforming catalysts, it is not unusual to employ three or more reactors in sequential arrangement through which the naphtha in combination with hydrogen rich gas is passed under conditions to reform the naphtha to desired octane reformate product. In this sequence, temperature and pressure conditions are selected and maintained as required so that naphthene dehydrogenation to aromatics and dehydrocyclization of paraffins may be accomplished to best advantage in the sequence of reaction zones provided. Thus, it may be said that where there are three reaction zones in series, naphthene dehydrogenation is accomplished in a major proportion in the first reactor and in minor proportions in the second and third reactors and dehydrocyclization reactions accompanied by some hydrocracking and isomerization reactions are effected in the second and third reaction zones. On the other hand in a reforming sequence comprising for example, four reaction zones, a major proportion of naphthene conversion may be accomplished in the first and second reaction zones with the remaining reactions of dehydrocyclization, hydrocracking and isomerization being accomplished in the third and fourth reaction zones. In accordance with a preferred operation within the scope of this invention, the reforming conditions are selected so that the on-stream pressure is usually maintained below about 400 p.s.i.g. and is generally maintained at a pressure selected from within the range of from about 200 to about 350 p.s.i.g. In a reforming operation of the kind herein-described it is not an unusual practice to employ a reduced pressure in the direction of flow of the reactants through the sequence of reforming zones amounting to no more than the pressure drop encountered by passage of the reactant through the catalyst beds and equipment provided while maintaining reforming temperatures at the inlet to each reactor selected from within the range of from about 800° F. to about 1000° F. and most usually not exceeding about 980° F. Adjustment of the reactant temperature between reactors is common practice and most usually accomplished in suitable furnaces provided. Generally, the pressure drop referred to above is such that the lead reactor or first reactor of the process may operate at a pressure which is from about 20 to about 100 p.s.i. higher than the pressure of the last reactor in the process. A weight hourly space velocity based on each reaction stage is usually selected from within the range of from about 0.5 to about 20 and sufficient hydrogen is provided with the hydrogen rich recycle gas to maintain a hydrogen partial pressure in the reforming process selected from within the range of from about 100 to about 300 p.s.i.a. In the reforming of naphtha hydrocarbons boiling up to about 320° F. for the production of relatively high octane reformate product, it is not unusual to prefer to employ naphthas rich in naphthene since they are readily convertible to high octane aromatic constituents. However, one of the further startling findings of the present invention resides in the observation that naphtha charges rich in paraffins may also be converted to high octane reformate product in substantial yields in combination with levels of hydrogen purity comparable to that obtainable with higher percentages of noble metal component catalysts. Thus, the information presented herein also confirms that when a naphtha charge is catalytically reformed in the presence of a platinum group metal reforming catalyst under a total reactor pressure less than about 400 p.s.i.g. and preferably less than about 300 p.s.i.g., that a significant increase in level of the recycle gas hydrogen purity and yield of $C_5+$ reformate product can be realized with a catalyst containing not more than about 0.4 weight percent of platinum.

In the reforming operation contemplated herein, the naphtha charge may be dried by any one of several different methods such as by means of percolation through a solid drying agent such as alumina, molecular sieves or contact with other solid absorbents or the naphtha may be effectively dried by distillation to provide a water content thereof usually less than about 10 to 15 p.p.m. by weight of water. The recycle gas recovered from the effluent of the last reactor may be cooled and then dried by contact with a solid absorbent material such as a molecular sieve material or other suitable solid absorbent material. It is preferred that the recycle gas be contacted with the solid absorbent material under conditions to reduce the moisture content thereof to not more than about 2 p.p.m. by volume at 200 p.s.i.g. which is equivalent to a partial pressure of water of not more than about 0.02 mm. of Hg at a total pressure of 200 p.s.i.g.

Description of specific embodiments

The invention hereinbefore-described will be more fully understood from a consideration of the following examples and figures provided in support thereof.

FIGURE 1 is a plot of data which shows the effect of water partial pressure (expressed as mm. of Hg in the third reactor effluent of a reforming operation) on the substantially steady state hydrogen ($H_2$) content of the recycle gas for an operation employing a 0.35 wt. percent platinum containing catalyst. The detailed operating conditions for each run shown in the figure are given in Table I. All of the data plotted to derive FIGURE 1 are for the 250 p.s.i.g. reforming operations processing a $C_6$—290° F. boiling paraffinic naphtha to 102.0 $C_5+$, R+3 octane product.

FIGURE II is a plot of the data obtained with a 0.6 wt. percent platinum catalyst arranged to show similarly to FIGURE I, the effect of water partial pressure on the hydrogen content of the recycle gas. It is to be particularly noted that the slope of the bar graph of FIGURE II is much less than that shown in FIGURE I thus showing that the 0.6 wt. percent platinum catalyst is much less sensitive to water partial pressure than a 0.35 wt. percent platinum catalyst.

FIGURE III presents a relationship of data points provided to show how the points plotted on FIGURES I and II were obtained. FIGURE III is therefore a plot of hydrogen purity data points and activity (as measured by inlet temperature for 102 octane product) vs. time on-stream for one platinum reforming aging study. In FIGURE III, the third reactor effluent water levels during on-stream times when the hydrogen purity was substantially in steady state condition are shown in the figure. For example, it will be observed that from day 4 to day 11, the $H_2$ purity of the recycle gas has found to be essentially constant at a value of about 72% when the water partial pressure averaged out to about 0.7 mm. of Hg. On the other hand from day 12 to about day 20, the hydrogen purity was about 70.5% when the water partial pressure averaged out to about 0.29 mm. of Hg. However, from day 20 to day 30 on-stream period it is to be noted that the hydrogen content and water content were changing rapidly thus indicating that the reforming unit was not operating in a steady state condition. The information presented in FIGURE III supplies the data points indicated by a circle on FIGURE II. The remaining points plotted on FIGURE II and FIGURE I were obtained from plots of data similar to FIGURE II for various pilot plant runs.

FIGURE IV shows the dramatic effect of controlled water addition within the limits defined by this invention on activity as represented by temperature change to produce 102 octane product and hydrogen purity for pilot plant run "F" identified more completely in Table I. It was observed that during the first 20 days on-stream, the operating unit was drying out and that from about 20 to 30 days on-stream period, the water vapor pressure in the unit remained substantially constant at less than about 0.01 mm. of Hg. During this on-stream period, the naphtha charge had a water content which was essentially zero. Beginning with day 27, water was injected in the naphtha charge at a rate of 36 p.p.m. weight (200 p.p.m. mole) and was equivalent to about 4.14 cc./bbl. (cc. water per barrel of naphtha charge). This rate of water addition maintained up until day 62 and resulted in a 0.192 mm. of Hg partial pressure of water in the third reactor effluent of the reforming unit. This partial pressure of water was found to be equivalent to about 14.5 p.p.m. (vol. basis) of $H_2O$ in the recycle gas when the separator temperature about 80° F. It will be observed from the data of FIGURE IV that a dramatic change in $H_2$ purity of the recycle gas was obtained after the water injection above defined and that the $H_2$ purity remained substantially constant during the period of continuous water addition after the 30 day period.

FIGURE V shows a similar effect on catalyst activity and hydrogen purity of the recycle gas obtained in a commercial refinery operation identified as Run N. The conditions of operation are provided in Table I. In addition, the water in the charge to the reforming operation was controlled for the first 48 days on-stream to about 0.7 cc./bbl. (6 p.p.m. by weight≈33.3 p.p.m. mole). During this on-stream period, it was found that the third reactor effluent had a water content of 2–3 p.p.m. mole (0.02–0.03 mm. of Hg). On about on-stream day 49, water was injected in the charge at a rate of 4.1 cc./bbl. (36 p.p.m. wt.≈200 p.p.m. mole) and soon thereafter resulted in a third reactor effluent having a water concentration of 12–15 p.p.m. mole or 0.13–0.16 mm. of Hg at a pressure of 190 p.s.i.g. at the outlet of the third reactor. It is to be observed from this figure that it took several days up to about 4 days for the full effect of the water addition to be realized as evidenced by the dramatic rise in $H_2$ purity of the recycle gas-stream in rising from about 54 to about an average of 73.

FIGURE VI is provided on the other hand to show the rate of decrease in $H_2$ purity on a percent (%) per day basis for operations where the $H_2$ content of the recycle gas is higher than equilibrium (e.g., the moisture level has just decreased), as a function of the water partial pressure. That is, if a reforming operation is providing a hydrogen purity of 75% at a water partial pressure of 0.1 mm. of Hg, the hydrogen level is not regarded as in equilibrium since from FIGURE I the $H_2$ equilibrium should be in a range of from about 56 to 63% $H_2$, say naphtha over a 0.35 wt. percent platinum reforming catalyst with that obtainable when processing a paraffinic naphtha at substantially the same moisture conditions as derived from the information presented in FIGURES I and VI. In this operation the water partial pressure was approximately 0.24 mm. of Hg for the first 95 days on-stream operation and then the water was reduced to about 0.08 mm. of Hg. The circle data points plotted show the actual hydrogen contents obtained when reforming a naphthenic charge naphtha containing 48% paraffins to 100.0 octane reformate product. The comparative dashed line presented shows the $H_2$ contents derived from FIGURES I and VI when reforming a paraffinic naphtha containing 70% paraffins to 100.0 octane reformate product. In this comparison it is to be observed that there is a very dramatic and different effect on the hydrogen purity of the recycle gas stream when processing the two different charge naphtha from the time the water is reduced as above specified.

Having thus provided a general description of the invention herein disclosed and provided specific examples in support thereof, it is submitted that no undue restriction should be imposed by reason of the specific examples presented.

TABLE I.—PtR PILOT PLANT CONDITIONS

| Run Number | Pt Reforming Catalyst | | Naphtha | | | Conditions | |
|---|---|---|---|---|---|---|---|
| | Weight Percent Pt | Fill Ratio | Boiling Range | Type | Mole Percent Paraffins | Pressure, p.s.i.g. | Octane $C_5+$ R+3 |
| C | 0.35 | 50/10/100 | $C_6$–290 | Kuwait | 72 | 250 | 102.0 |
| A | 0.35 | 28/72/100 | $C_6$–290 | Kuwait/Kirkuk | 72/68 | 250 | 102.0 |
| J | 0.35 | 28/72/100 | $C_6$–290 | Kuwait | 72 | 250 | 102.0 |
| E | 0.35 | 50/100/100 | $C_6$–290 | Kirkuk | 68 | 250 | 102.0 |
| B | 0.35 | 28/72/100 | $C_6$–290 | Kuwait | 72 | 250 | 102.0 |
| K | 0.60 | 28/72/100 | $C_6$–290 | do | 72 | 250 | 102.0 |
| L | 0.60 | 28/72/100 | $C_6$–290 | Kuwait/Kirkuk | 72/68 | 250 | 102.0 |
| F | 0.35 | 28/72/100 | $C_6$–290 | Kirkuk | 68 | 250 | 102.0 |
| M | 0.35 | 20/30/100 | $C_6$–275 | Bmt. Blend | 49 | 200 | 100.0 |
| D | 0.35 | 28/72/100 | $C_6$–290 | Kirkuk | 68 | 250 | 102.0 |
| G | 0.375 | 28/72/100 | $C_6$–290 | Kuwait/Kirkuk | 68/72 | 250 | 102.0 |
| H | 0.40 | 28/72/100 | $C_6$–290 | do | 68/72 | 250 | 102.0 |
| N | 0.35 | | $C_6$–275 | Mixed | 60–75 | [1] 190 | 101.0 |

[1] Third reactor outlet.

about 60% hydrogen. From FIGURE VI we observe however that the hydrogen decline would be from about 75% to about 60% at a rate of from about 0.14 to about 0.56% per day or on an average of about 0.4% per day. Thus, it would take at this rate of decline approximately, 37.5 days for the hydrogen level to reach its equilibrium condition of 60% after removal of water from the charge. The broad ban curve of FIGURE VI is representative of that obtained with a 0.35% wt. platinum reforming catalyst when the hydrogen content is greater than equilibrium. It is to be noted that catalysts of a different platinum content generate a different decline rate.

It is to be observed on the other hand from the information presented herein that when the $H_2$ content is less than equilibrium condition (that is the moisture level has been increased) that the hydrogen content of the gas reaches equilibrium very rapidly. In fact, it has been observed that when water is injected under these conditions in the charge to the reforming unit, that the hydrogen content of the recycle gas will increase very rapidly and before water is detected in the third reactor effluent. It is believed that this condition occurs because the higher water partial pressure in the first reactor affects the reforming reactions before all the catalyst in the second and third reactor has become hydrated to its new level.

FIGURE VII is presented to further emphasize the dramatic observation of this invention and is arranged to show a comparison of the effects of a relatively dramatic decrease in water concentration upon the recycle gas hydrogen content when reforming a naphthenic

We claim:

1. A method for reforming paraffin rich naphtha at a pressure in the range of from about 100 to about 400 p.s.i.g. to produce a high octane reformate product and maintain the $H_2$ content of the recycle gas at a value of at least about 60% $H_2$ purity with a catalyst comprising from about 0.3 to about 0.45 wt. percent platinum which comprises passing a paraffin rich naphtha hydrocarbon combined with an excess of $H_2$ rich gas in contact with said platinum reforming catalyst at a temperature in the range of from about 850° F. to about 980° F., and maintaining a partial pressure of water in the total effluent recovered from the last reactor of the reforming operation in the range of from about 0.1 to about 0.2 mm. of Hg by substantially continuously dispersing sufficient water in said naphtha recycle gas charge passed to said reforming process.

2. In a low pressure catalytic reforming process employing at least three reforming reactors in sequence and containing a platinum reforming catalyst maintained at a reforming temperature selected from within the range of from about 850° F. to about 980° F. and a pressure in the range of from about 100 to about 400 p.s.i.g., the improvement which permits minimizing the platinum requirements of the reforming catalyst employed therein substantially below about 0.6 wt. percent Pt without significantly reducing the $H_2$ content of the recycle gas produced in the process which comprises maintaining during stabilized reforming of said naphtha charge an amount of water dispersed in the naphtha-$H_2$ recycle gas mixture charged to the first reactor at a $H_2O$ partial pressure in the range of from about 0.08 to about 0.16 mm. Hg.

3. In a catalytic reforming process employing three or more separate reactors containing a platinum reforming catalyst maintained at a temperature selected from within the range of from about 850° F. to about 980° F. and a pressure in the range of from about 100 to about 400 p.s.i.g., the improvement which comprises employing a reforming catalyst containing not more than about 0.45 wt. percent platinum and maintaining the $H_2$ purity of the recycle gas produced in said reforming process at a value in excess of 60 mole percent by maintaining equilibrium conditions and a moisture level sufficient to limit the partial pressure of water in the effluent recovered from the last reactor of the reforming process in the range of from about 0.1 to about 0.2 mm. Hg.

4. The process of claim 3 wherein the recycle gas recovered from the product effluent is dried with a solid sorbent material to a level of not more than 2 p.p.m. of water before being combined with the naphtha charge.

References Cited

UNITED STATES PATENTS

| | | | |
|---|---|---|---|
| 2,952,611 | 9/1960 | Haxton et al. | 208—65 |
| 3,000,811 | 9/1961 | Murray et al. | 208—138 |
| 3,234,120 | 2/1966 | Capsuto | 208—138 |
| 3,258,420 | 6/1966 | Dalson et al. | 208—138 |
| 3,330,761 | 7/1967 | Capsuto et al. | 208—138 |
| 3,340,321 | 9/1967 | Craig | 260—680 |
| 3,347,782 | 10/1967 | Capsuto et al. | 208—138 |
| 3,364,137 | 1/1968 | Bergendorf et al. | 208—138 |

HERBERT LEVINE, Primary Examiner

U.S. Cl. X.R.

208—65